United States Patent [19]

Ueda

[11] Patent Number: 4,658,170

[45] Date of Patent: Apr. 14, 1987

[54] ROTOR FOR A SUPERCONDUCTING ROTATING ELECTRIC MACHINE

[75] Inventor: Akinori Ueda, Kobe, Japan

[73] Assignee: Mitsubishi Denki Kabushiki Kaisha, Tokyo, Japan

[21] Appl. No.: 751,943

[22] Filed: Jul. 5, 1985

[30] Foreign Application Priority Data

Jul. 5, 1984 [JP] Japan ................... 59-140801

[51] Int. Cl.[4] .............................. H02K 3/48
[52] U.S. Cl. ..................... 310/214; 310/52; 310/91; 310/261
[58] Field of Search .......... 310/10, 52, 61, 65, 310/214, 91, 261, 270, 71

[56] References Cited

U.S. PATENT DOCUMENTS

| | | | |
|---|---|---|---|
| 790,471 | 5/1905 | Wright | 310/61 |
| 790,475 | 5/1905 | Behrend | 310/61 |
| 3,427,488 | 2/1969 | Terry, Jr. | 310/214 |
| 4,016,444 | 4/1977 | Gillet | 310/52 |
| 4,063,122 | 12/1977 | Kullmann | 310/10 |
| 4,149,100 | 4/1979 | Spirk | 310/65 |
| 4,368,399 | 1/1983 | Ying | 310/270 |
| 4,385,248 | 5/1983 | Laskaris | 310/52 |
| 4,392,602 | 5/1982 | Gillet | 310/52 |
| 4,442,362 | 4/1984 | Okamoto | 310/52 |

FOREIGN PATENT DOCUMENTS 2804654 2/1978 Fed. Rep. of Germany .
2854059 12/1978 Fed. Rep. of Germany .
57-166839 10/1982 Japan .

OTHER PUBLICATIONS

Ser. No. 819,294 filed 1-10-86 by Toshiki Hirao.
Ser. No. 751,899 filed 7-5-85 by Ueda et al.

*Primary Examiner*—R. Skudy
*Attorney, Agent, or Firm*—Leydig, Voit & Mayer

[57] ABSTRACT

An improved rotor for a superconducting rotating electric machine has the arcuate portions and the corners of superconducting field coils housed in circumferentially-extending coil slots of a coil-carrying shaft. Retaining rings which are shrink-fit on the coil-carrying shaft over the circumferentially-extending slots restrains the arcuate portions and the corners of the coils against centrifugal forces. Retaining members are disposed between adjacent coils and are rigidly secured by connectors to the bottom surface of the circumferentially-extending slots by bolts or the like. The retaining members completely fill the spaces between adjacent coils and prevent the movement of the arcuate portions and corners of the field coils. Preferably, the retaining members are made of the same material as the coil-carrying shaft or of titanium or a titanium alloy.

5 Claims, 7 Drawing Figures

ROTOR FOR A SUPERCONDUCTING ROTATING ELECTRIC MACHINE

BACKGROUND OF THE INVENTION

The present invention relates to a rotor for a superconducting rotating electric machine. More particularly, it relates to a rotor for a superconducting rotating electric machine in which the superconducting field coils are more reliably secured to the rotor.

Due to the very high speeds of rotation of a rotor for a superconducting rotating electric machine, the superconducting field coils of such a rotor are subjected to very high centrifugal forces. Since any movement of the field coils may not only result in their damage but may generate frictional heat which can cause a loss of superconductivity, it is extremely important that the coils be rigidly secured to the rotor.

FIGS. 1 through 5 illustrate a conventional rotor for a superconducting rotating electric machine of the type disclosed in Japanese Laid Open Patent Application No. 57-166839, of which FIG. 1 is an overall cross-sectional view. As can be seen from FIG. 1, the rotor has a cylindrical torque tube 1 in the middle of which is formed a coil-carrying shaft 2. The outer periphery of the rotor is defined by a cylindrical warm damper shield 4, which is rigidly secured at either end to an outboard shaft 8 and an inboard shaft 9, the inboard shaft 9 being connected to an unillustrated turbine or load, depending upon whether the rotor is used as part of a generator or a motor. Both of the shafts 8 and 9 are journaled in bearings 10. The inboard shaft 9 has slip rings 11 formed thereon by which current is supplied to superconducting field coils 3 mounted on the coil-carrying shaft 2. A cylindrical cold damper shield 5 is secured to the torque tube 1 between the coil-carrying shaft 2 and the warm damper shield 4. The damper shields 4 and 5 serve to shield the superconducting field coils 3 from alternating current magnetic field, and also serve to damp low frequency oscillations of the rotor during disturbances of the electrical system to which the rotor is connected. Liquid helium, whose flow is indicated by the arrows, is supplied to the inner cavity of the coil-carrying shaft 2 and to heat exchangers 12 formed in or mounted on the torque tube 1 by unillustrated piping. The inner cavity of the coil-carrying shaft 2 is hermetically sealed by an outer tube 6 secured to the outer periphery of the coil-carrying shaft 2 and by end plates 7 secured to the ends of the coil-carrying shaft 2 so that liquid helium introduced into the cavity will not spread to other parts of the rotor. Thermal radiation shields 13 which protect the field coils 3 from lateral radiation are mounted on the torque tube 1 at the ends of the coil-carrying shaft 2. The portions indicated by reference numeral 14 are evacuated.

As shown in FIG. 2, each of the superconducting field coils 3 comprises parallel straight portions 31 which extend parallel to the axis of the coil-carrying shaft 2 in which it is mounted, arcuate portions 32 formed at the ends of the straight portions 31 which extend circumferentially over the coil-carrying shaft 2, and corners 33 which connect the straight portions 31 and the arcuate portions 32.

As shown in FIG. 4, which is a cross-sectional view taken along Line A—A of FIG. 1, the coil-carrying shaft 2 has a number of parallel longitudinally-extending coil slots 18a machined therein in which the straight portions 31 of the field coils 3 are housed. The coil slots 18a are separated from one another by rotor teeth 2a which extend radially outward from the longitudinal axis of the coil-carrying shaft 2. Wedges 15 are inserted into wedge grooves formed in the rotor teeth 2a so as to restrain the straight portions 31 of the field coils 3 housed in the slots 18a against centrifugal forces. Each of the coils 3 is surrounded on its bottom and sides by longitudinally-extending electrical coil insulation 19 and on its top by wedge insulation 20. For the purpose of better illustrating the structure, the coil 3 and insulation for the leftmost of the slots 18a in FIG. 4 have been omitted.

As shown in FIG. 5, at each end of the coil-carrying shaft 2 is a section with a reduced outer diameter. In these sections the arcuate portions 32 and the corners 33 of the superconducting field coils 3 are housed in wide circumferentially-extending slots 18b which join the ends of the axially-extending slots 18a (not shown in FIG. 5). While each of the axially-extending slots 18a houses the straight portion 31 (not shown in FIG. 5) of only a single coil 3, the circumferentially-extending slots 18b each house the arcuate portions 32 and corners 33 of a plurality of field coils 3. The bottom surface of these slots 18b is covered with bottom electrical insulation 21 on which the coils 3 sit, and the tops of the coils 3 are covered by a cylindrical electrically-insulating cover 22. A retaining ring 16 is shrink-fit over the insulating cover 22 so as to restrain the coils 3 against centrifugal forces. Between each of the coils 3 and between the coils 3 and the sides of the slots 18b, electrically-insulating packing 17 is disposed which serves to insulate the coils 3 from one another and to prevent their sideways movement.

However, the electrically insulating packing 17 between the arcuate portions 32 of the field coils 3 has a coefficient of thermal expansion which is about twice as large as that of the coil-carrying shaft 2 or the field coils 3. Therefore, while it is possible to rigidly secure the field coils 3 in the circumferentially-extending slots 18b at normal temperatures, when the rotor is cooled to extremely low temperatures during operation, gaps develop between the arcuate portions 32 of the field coils 3 and the electrically insulating packing 17. As the electrically insulating packing 17 is not secured to the slots 18b in the coil-carrying shaft 2, it is possible for the arcuate portions 32 of the field coils 3 to move due to the gaps, producing frictional heat which may cause a loss of superconductivity.

An alternative method of securing field coils to a rotor which has been used in the past is to house not only the longitudinally extending portions of the field coils but also the arcuate portions of the coils in individual slots in the rotor. The arcuate portions of the field coils are held in the slots by wedges, just as are the longitudinally-extending portions. While such a structure can secure the coils against movement, it is impossible to install a previously-wound field coil into the slots in the rotor. Rather, the field coils must be wound inside the slots, which makes their installation extremely time-consuming and expensive.

SUMMARY OF THE INVENTION

It is an object of the present invention to provide an improved rotor for a superconducting rotating electric machine in which the field coils are reliably secured to the rotor at all temperatures.

It is a further object of the present invention to provide a rotor for a superconducting rotating electric machine in which previously-wound field coils can be easily installed in the rotor.

In an improved rotor for a superconducting rotating electric machine according to the present invention, the arcuate portions of superconducting field coils are separated from one another not by electrically-insulating packing but by retaining members which are secured by connectors to circumferentially-extending slots in a coil-carrying shaft by bolts or the like. The retaining members are preferably made of the same material as the coil-carrying shaft or of titanium or a titanium alloy. The arcuate portions of the coils are restrained against centrifugal forces by retaining rings in the conventional manner. As the retaining members have a coefficient of thermal expansion close to that of the the coil-carrying shaft, gaps do not develop around the field coils at low temperatures, and as the retaining members are rigidly secured to the coil-carrying shaft, the field coils are secured against lateral movement.

Additional objects and features of the invention will become clear from the following description in which the preferred embodiments have been set forth in detail in conjunction with the accompanying drawings.

BRIEF DESCRIPTION OF THE DRAWINGS

In the drawings, the same reference numerals indicate the same or corresponding parts.

DESCRIPTION OF THE PREFERRED EMBODIMENT

Figure 1:
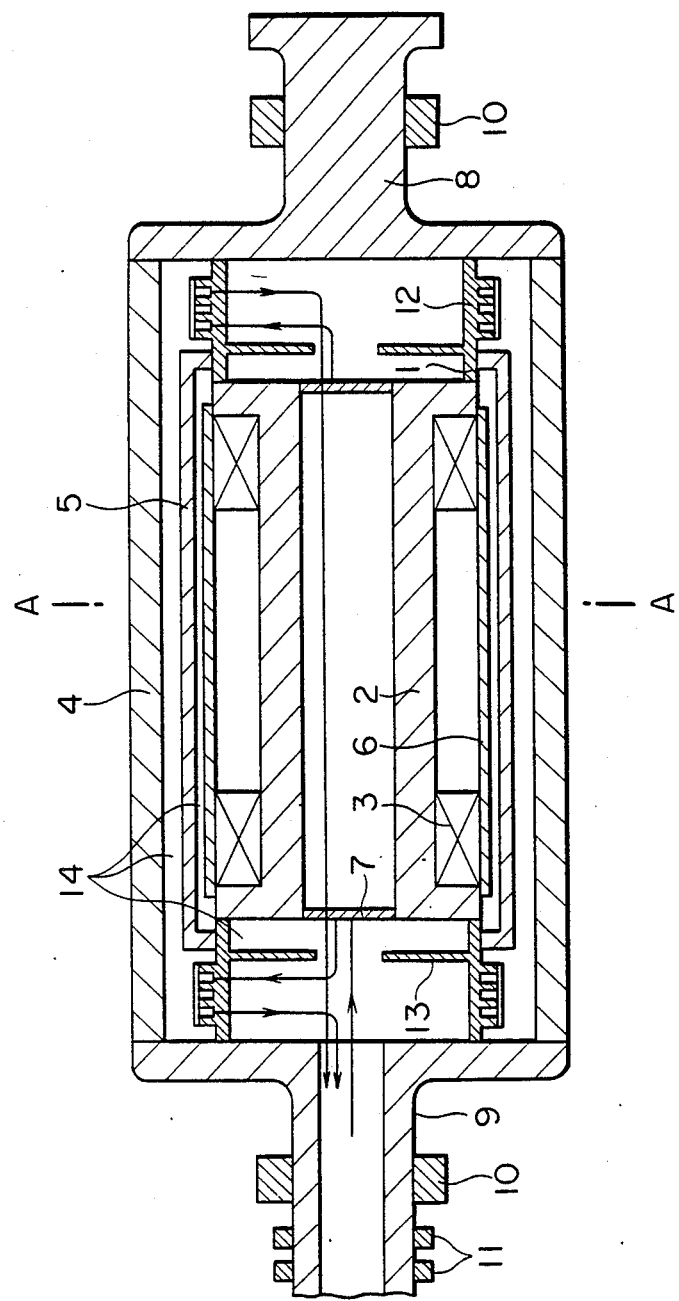
FIG. 1 is a longitudinal cross-sectional view of a conventional rotor for a superconducting rotating electric machine of the type to which the present invention pertains.
Figure 2:
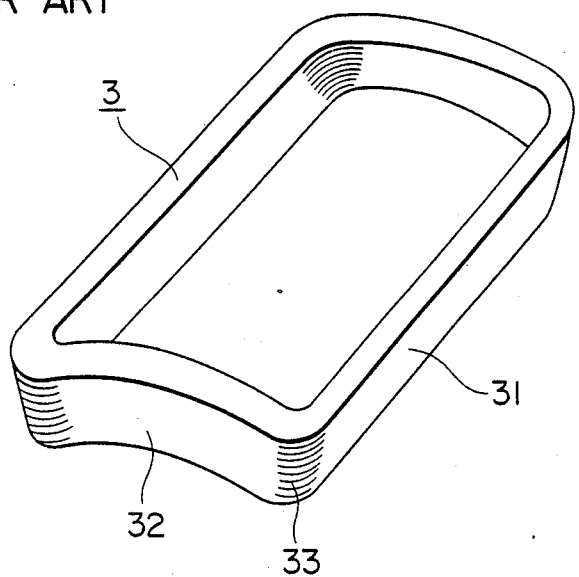
FIG. 2 is a perspective view of a superconducting field coil of the rotor of FIG. 1.
Figure 3:
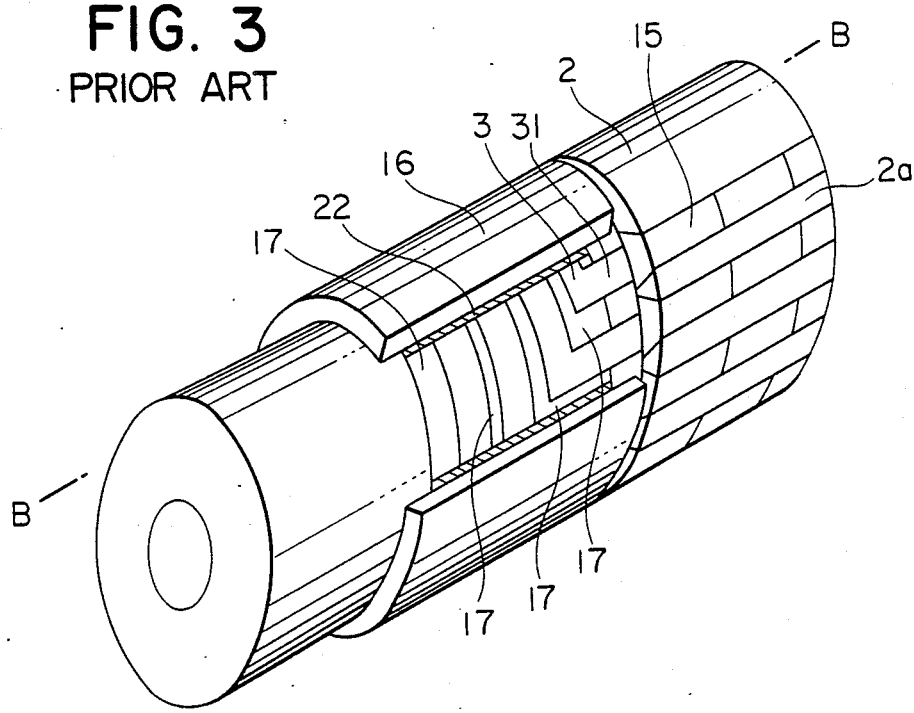
FIG. 3 is a perspective view of the end portion of the coil-carrying shaft of the rotor of FIG. 1.
Figure 4:
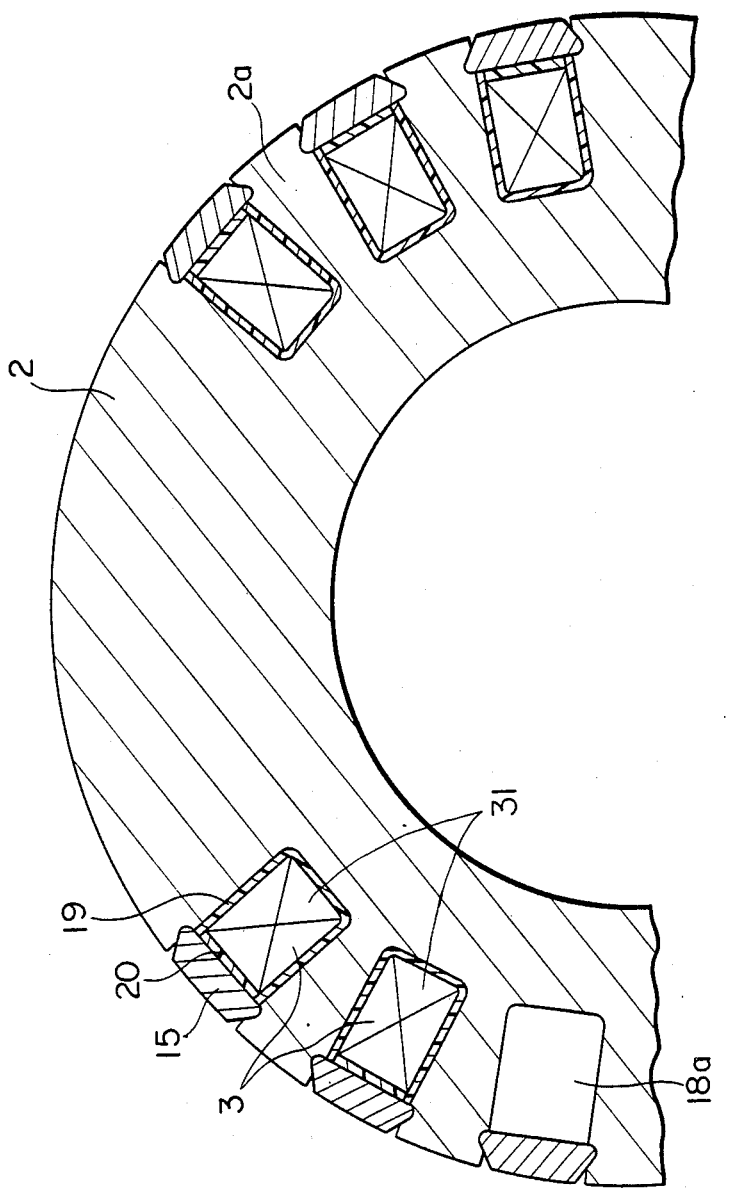
FIG. 4 is a cross-sectional view of the rotor of FIG. 1 taken along Line A—A.
Figure 5:
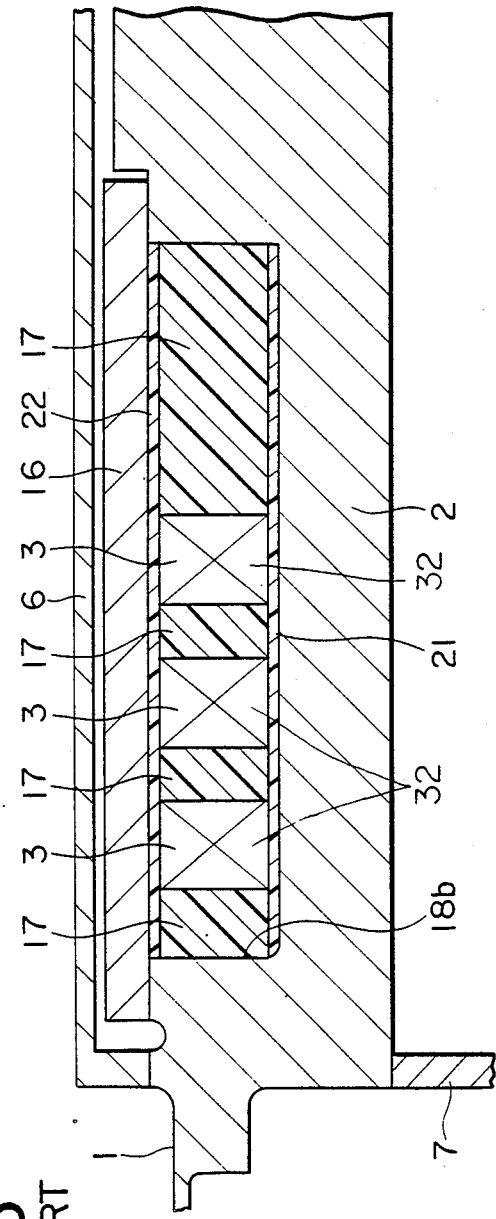
FIG. 5 is a cross-sectional view of a portion of the coil-carrying shaft of FIG. 3 taken along Line B—B.
Figure 6:
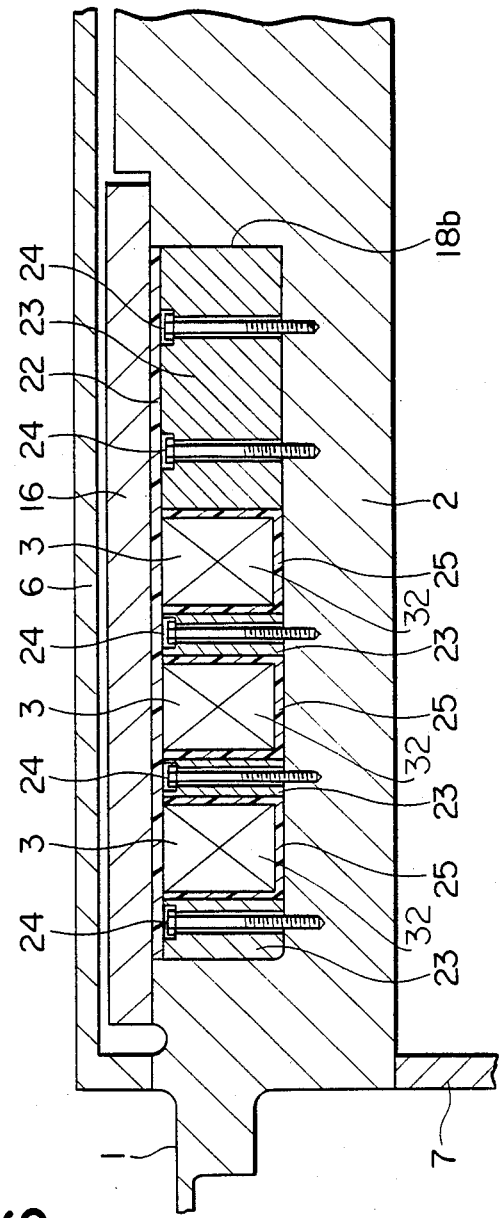
FIG. 6 is a cross-sectional view similar to FIG. 5 showing the structure of a coil-carrying shaft of a rotor for a superconducting rotating electric machine according to an embodiment of the present invention.
Figure 7:
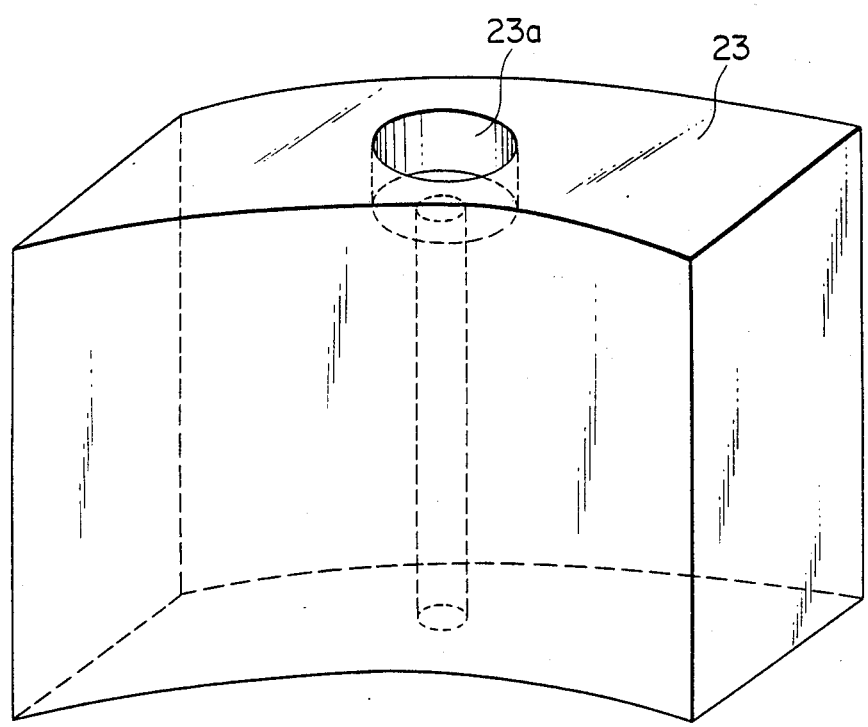
FIG. 7 is a perspective view of one of the retaining members of FIG. 6.

Hereinbelow, an embodiment of a rotor for a superconducting rotating electric machine will be described while referring to FIGS. 6 and 7. The overall structure of the rotor is identical to that illustrated in FIG. 1, and the manner of housing the straight portions 31 of the field coils 3 is identical to that illustrated in FIGS. 3 and 4, and accordingly those portions will not be further described. FIG. 6 is a cross-sectional view of the end portion of a coil-carrying shaft 2 of a rotor according to the present invention. The arcuate portions 32 and the corners 33 of the field coils 3 are housed in circumferentially-extending slots 18b and are restrained against centrifugal forces by a retaining ring 16 which is shrink-fit over the end of the coil-carrying shaft 2. Each of the circumferentially-extending slots 18b houses the arcuate portions 32 and corners 33 of a plurality of field coils 3. The tops of the coils 3 are covered with an electrically insulating cover 22 as in FIG. 5. However, in the present embodiment, the bottoms and sides of the coils 3 are insulated by coil insulation 25 similar to the coil insulation which is used to insulate the straight portions 31 of the coils 3, and instead of electrically insulating packing 17, retaining members 23 secured to the bottom surface of the circumferentially-extending slots 18b are used to restrain the arcuate portions 32 and the corners 33 of adjacent coils 3 against lateral forces. The retaining members 23 are disposed between adjacent coils 3 and between the coils 3 and the sides of the slots 18b. FIG. 7 is a perspective view of one of the retaining members 23 of FIG. 6. Each retaining member 23 has arcuate top and bottom surfaces to conform to the shape of the circumferentially-extending slots 18b and of the inner surface of the insulating cover 22, and it has one or more countersunk bolt holes 23a formed therein through which pass connected such as bolts 24 which screw into holes formed in the bottom surface of the slots 18b. The dimensions of the retaining members 23 are chosen such that they completely fill the spaces between adjoining field coils 3 and thereby prevent their lateral movement.

It is desirable that the retaining members 23 be made of the same material as the coil-carrying shaft 2 or of a material having a similar coefficient of thermal expansion so that the rates of thermal shrinkage will be the same for the two and gaps will not develop between the retaining members 23 and the coils 3. Titanium or titanium alloys are particularly suitable materials for the retaining members 23 since they have a very low coefficient of thermal expansion.

The superconducting field coils 3 can be housed in the coil-carrying shaft 2 in the conventional manner. Namely, the straight portions 31 of the coils 3 are inserted into the axially-extending slots 18a, after which the arcuate portions 32 and the corners 33 of the coils 3 are inserted into the circumferentially-extending slots 18b. The wedges 15 are then pounded into the wedge grooves in the teeth 2a adjoining the straight portions 31, and the retaining members 23 are inserted between the coils 3 and bolted to the coil-carrying shaft 2, after which the retaining rings 16 are shrink-fit over the ends of the coil-carrying shaft 2. The width of each of the circumferentially-extending slots 18b is much larger than the width of the coils housed therein, and accordingly a previously-wound coil 3 can be easily inserted.

As the retaining members 23 are made of a material having a coefficient of thermal expansion the same as or close to that of the coil-carrying shaft 2 or else are made of a material like titanium which has a very low coefficient of thermal expansion, gaps do not develop between the retaining members 23 and the coils 3 even at very low temperatures. Furthermore, even if very small gaps do develop around the coils 3, as the retaining members 23 are rigidly secured in place, tiny gaps can not accumulate to form larger gaps by the movement of the retaining members 23 and the coils 3. Accordingly, the coils 3 are restrained against movement, and since movement of the coils 3 is not possible, frictional heat which can cause a loss of superconductivity can not be generated.

What is claimed is:

1. A rotor for a superconducting rotating electric machine comprising:
   a plurality of superconducting field coils each of which has straight portions, arcuate portions at the ends of the straight portions, and corners connecting said straight portions and said arcuate portions;

a coil-carrying shaft in which are formed a plurality of longitudinally-extending straight coil slots and a plurality of circumferentially-extending coil slots connected to the ends of said straight coil slots, each of said straight coil slots having housed therein a straight portion of one of said field coils and each of said circumferentially-extending coil slots having housed therein the arcuate portions and the corners of a plurality of said field coils;

a plurality of wedges which fit into wedge grooves formed in said coil-carrying shaft adjoining said straight coil slots, said wedges fitting over the straight portions of said field coils so as to restrain the straight portions of said field coils against centrifugal forces;

a retaining ring which is shrink fit on said coil-carrying shaft over said circumferentially-extending slots so as to restrain the arcuate portions and corners of said field coils against centrifugal forces; and retaining members which are secured by connectors in said circumferentially-extending slots adjacent to the arcuate portions and corners of said field coils, which are rigidly secured to the bottom surfaces of said circumferentially-extending slots, which completely fill the spaces between adjacent field coils and between said field coils and the sides of said circumferentially-extending slots so as to restrain the arcuate portions and the corners of said field coils against movement, and which have a coefficient of thermal expansion substantially equal to that of the coil-carrying shaft.

2. A rotor as claimed in claim 1, wherein said retaining members are made of the same material as said coil-carrying shaft.

3. A rotor as claimed in claim 1, wherein said retaining members are made of titanium.

4. A rotor as claimed in claim 1, wherein said retaining members are made of a titanium alloy.

5. A rotor as claimed in claim 1, wherein said retaining members are secured to said circumferentially-extending slots by bolts.

* * * * *